No. 768,080. PATENTED AUG. 23, 1904.
M. L. SCHOEBEL.
PHOTOGRAPHIC FILM HOLDER.
APPLICATION FILED APR. 11, 1904.
NO MODEL.
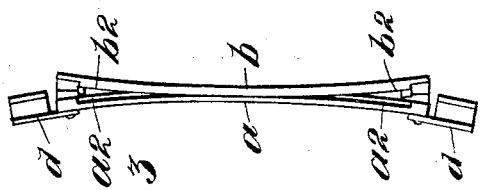
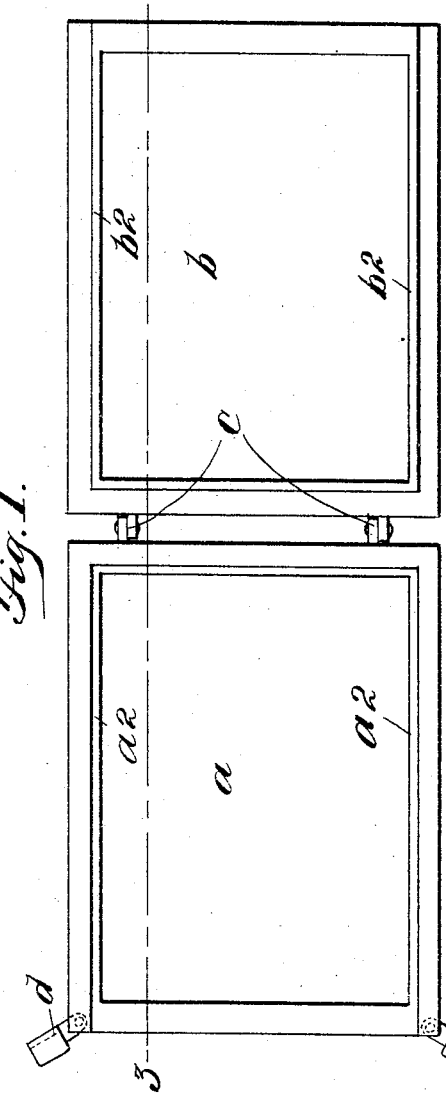
WITNESSES
A. B. Mattingly
F. A. Stewart
INVENTOR
BY Maximilian L. Schoebel,
Edgar Tate & Co
ATTORNEYS No. 768,080.

Patented August 23, 1904.

UNITED STATES PATENT OFFICE.

MAXIMILIAN L. SCHOEBEL, OF NEWARK, NEW JERSEY.

PHOTOGRAPHIC-FILM HOLDER.

SPECIFICATION forming part of Letters Patent No. 768,080, dated August 23, 1904.

Application filed April 11, 1904. Serial No. 202,555. (No model.)

*To all whom it may concern:*

Be it known that I, MAXIMILIAN L. SCHOEBEL, a citizen of the United States, residing at Newark, in the county of Essex and State of New Jersey, have invented certain new and useful Improvements in Photographic-Film Holders, of which the following is a specification, such as will enable those skilled in the art to which it appertains to make and use the same.

The object of this invention is to provide an improved holder for photographic films designed for use in the developing and fixing processes, a further object being to provide a holder of the class specified which comprises two rectangular spring-frames hinged together at one end and adapted to be locked together at the opposite ends and between which a photographic film may be securely held; and with these and other objects in view the invention consists in a frame or holder of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is a side view showing the film-holder with the separate parts thereof extended; Fig. 2, an end view showing the separate parts folded together, but not locked together; Fig. 3, a section on the line 3 3 of Fig. 1, and Fig. 4 an end view showing the separate parts of the frame locked together.

In the practice of my invention I provide two rectangular open frames $a$ and $b$, which are composed of any suitable spring material, rubber being preferred, and these frames are hinged together at one end, as shown at $c$, and one of said frames (the frame $a$ in the form of construction shown) is provided at its opposite end and at the corners thereof with pivoted catches or locks $d$, which are adapted to engage the corresponding end of the other frame, so as to lock said frames together, as shown in Fig. 4.

The frames $a$ and $b$ are curved longitudinally, as shown in Fig. 3, and the ends thereof are also preferably slightly curved, as shown in Fig. 2, and the frame $a$ in the form of construction shown is provided around the central opening therein with a groove $a^2$, which opens outwardly through the free end of said frame, and the frame $b$ is provided with a corresponding rib $b^2$, which is adapted to fit in said groove, and in practice the film to be developed and fixed is placed in the groove $a^2$, and the frames are then folded together and clamped together or locked together by means of the locking devices $d$. By curving the frames $a$ and $b$ as shown the film is securely held at all points or all parts of the edges thereof, the frames when pressed together and locked together pressing on said films in order to accomplish this result.

When a film has once been secured in my improved holder or frame, the process or processes of developing and fixing may be carried out, as will be readily understood, without touching the film in any way or without handling it, the entire frame being immersed in the developing liquid or in the fixing liquid, as may be required, and the film may thus be inserted into and removed from said liquids without injury thereto, and the holder or frame may be handled in any desired manner, as will be readily understood.

My invention is not limited to the exact details of the construction of the separate frames $a$ and $b$ as herein shown and described, any construction which will enable said frames to securely hold the film being all that is necessary, and it will also be apparent that the curving of the frames $a$ and $b$ in the manner herein described may be dispensed with without departing from the spirit of my invention or sacrificing its advantages.

Having fully described my invention, what I claim as new, and desire to secure by Letters Patent, is—

1. A photographic-film holder, comprising two oblong frames composed of spring material and hinged together at one end and curved longitudinally and the convex surfaces of which are adapted to be pressed together when the frames are folded together, and means for locking said frames together at their free ends, substantially as shown and described.

2. A photographic-film holder, comprising two oblong frames composed of spring material and hinged together at one end and curved longitudinally and the convex surfaces of which are adapted to be pressed together when the frames are folded together, and means for locking said frames together at their free ends, one of said frames being provided with a groove and the other with a rib adapted to fit therein, subtantially as shown and described.

In testimony that I claim the foregoing as my invention I have signed my name, in presence of the subscribing witnesses, this 7th day of April, 1904.

MAXIMILIAN L. SCHOEBEL.

Witnesses:
F. A. STEWART,
C. E. MULREANY.